United States Patent
Pangrcic

(10) Patent No.: US 9,848,590 B2
(45) Date of Patent: Dec. 26, 2017

(54) LEECH CLAMP

(71) Applicant: JB III & Things, LLC, Davenport, IA (US)

(72) Inventor: Robert A. Pangrcic, LaSalle, IL (US)

(73) Assignee: JB III & Things, LLC, Sevierville, TN (US)

(*) Notice: Subject to any disclaimer, the term of this patent is extended or adjusted under 35 U.S.C. 154(b) by 147 days.

(21) Appl. No.: 14/446,871

(22) Filed: Jul. 30, 2014

(65) Prior Publication Data

US 2016/0029608 A1 Feb. 4, 2016

(51) Int. Cl.
  *A01K 97/04* (2006.01)
  *A01K 97/00* (2006.01)
  *A01K 99/00* (2006.01)

(52) U.S. Cl.
  CPC .............. *A01K 97/04* (2013.01); *A01K 97/00* (2013.01); *A01K 99/00* (2013.01)

(58) Field of Classification Search
  CPC ........ A01K 97/00; A01K 79/00; A01K 99/00; A01K 97/04; B25B 9/02; B25B 9/00
  USPC ......... 43/4, 55; 294/99.1, 99.2; 24/455, 499, 24/507, 519, 530, 531, 30.5 R, 559, 542, 24/552, 563, 564, 902; 30/363, 358, 322; 83/684, 685; 606/151, 157, 158; D19/72
  See application file for complete search history.

(56) References Cited

U.S. PATENT DOCUMENTS

| | | | | |
|---|---|---|---|---|
| 168,332 A | * | 10/1875 | Hill | A44B 1/18 24/563 |
| 183,771 A | * | 10/1876 | McGovern | B26F 1/36 30/363 |
| 223,066 A | * | 12/1879 | Russell, Jr. | F24L 315/10 294/11 |
| 409,880 A | * | 8/1889 | Stewart | D06F 55/00 24/549 |
| 422,666 A | * | 3/1890 | Tull et al. | B26F 1/36 30/178 |
| 437,877 A | * | 10/1890 | Truax | A47C 21/022 211/57.1 |
| 740,416 A | * | 10/1903 | Gebhardt | A01K 83/06 43/44.6 |
| 828,625 A | * | 8/1906 | Ogg | B25B 9/02 24/40 |
| 1,329,422 A | * | 2/1920 | McKelvey | G03D 13/10 248/317 |
| 1,450,795 A | * | 4/1923 | Dohe | B23D 29/02 30/229 |

(Continued)

FOREIGN PATENT DOCUMENTS

GB 2153288 A * 8/1985 ............ A01K 97/04
JP 07313030 A * 12/1995

(Continued)

*Primary Examiner* — Darren W Ark
(74) *Attorney, Agent, or Firm* — Davis, Brown, Koehn, Shors & Roberts, P.C.; Matthew Warner-Blankenship

(57) ABSTRACT

A clamp is provided which is adapted for use in fishing and other outdoor activities. The clamp includes a plurality of elongate segments and a grasper, which further features a plurality of tines. In operation, the clamp is operated by the user so as to grasp and hold live bait for baiting a hook. The clamp is typically operated by the user applying pressure against a tension, so as to actuate the grasper between open and closed positions.

12 Claims, 4 Drawing Sheets

(56) References Cited

U.S. PATENT DOCUMENTS

| | | | | |
|---|---|---|---|---|
| 1,454,213 A * | 5/1923 | Chapman | G03D 13/10 | 24/564 |
| 1,545,693 A * | 7/1925 | Phoel | B25B 9/02 | 269/254 R |
| 1,679,039 A * | 7/1928 | Kucera | B25B 7/20 | 30/363 |
| 1,936,783 A * | 11/1933 | Chase | B41K 3/38 | 101/26 |
| 1,979,528 A * | 11/1934 | Bruce | B23K 9/282 | 219/138 |
| 2,215,725 A * | 9/1940 | Martinson | A61B 17/1227 | 24/564 |
| 2,254,798 A * | 9/1941 | Dye | G03D 13/10 | 24/564 |
| 2,428,558 A * | 10/1947 | Drucker | G03D 13/10 | 24/564 |
| 2,573,922 A * | 11/1951 | Meyer | A47J 43/283 | 294/7 |
| 2,585,089 A * | 2/1952 | Caldwell | B63B 21/08 | 114/294 |
| 2,611,982 A * | 9/1952 | Sears | A01K 97/18 | 294/106 |
| 2,653,048 A * | 9/1953 | Novak | A22C 25/06 | 24/557 |
| 2,852,831 A * | 9/1958 | Hanna | A47H 13/01 | 24/559 |
| 2,885,814 A * | 5/1959 | Schlador | A01K 97/00 | 43/4 |
| 2,916,845 A * | 12/1959 | Grindstaff | A01K 97/04 | 43/4 |
| 2,929,166 A * | 3/1960 | Sneide | A01K 97/00 | 43/4 |
| 2,982,045 A * | 5/1961 | Highland | A01K 97/05 | 141/337 |
| 3,059,369 A * | 10/1962 | Swanson | A01K 97/00 | 43/4 |
| 3,065,561 A * | 11/1962 | Swanson | A01K 97/05 | 43/4 |
| 3,140,519 A * | 7/1964 | Johnson | B65D 33/1675 | 24/563 |
| 3,201,888 A * | 8/1965 | Barbee | A01K 97/00 | 43/4 |
| 3,274,687 A * | 9/1966 | Le Blanc | G03D 15/043 | 30/360 |
| 3,291,476 A * | 12/1966 | Calkin | B23K 3/082 | 228/57 |
| 3,308,570 A * | 3/1967 | Horton | A01K 97/04 | 43/4 |
| 3,604,425 A * | 9/1971 | Le Roy | A61B 17/1227 | 24/562 |
| 3,862,507 A * | 1/1975 | Martyn | A01K 97/00 | 43/4 |
| 3,879,879 A * | 4/1975 | Bobo | A01K 97/04 | 43/4 |
| 3,921,327 A * | 11/1975 | Casazza | A01K 97/18 | 43/4 |
| 3,975,853 A * | 8/1976 | Aaron | A01K 97/00 | 43/4 |
| 3,981,527 A * | 9/1976 | Ciano | B25B 9/02 | 294/33 |
| 4,033,037 A * | 7/1977 | Cooley | B21D 28/24 | 30/363 |
| 4,291,464 A * | 9/1981 | Garrett | B26F 1/36 | 30/360 |
| RE32,460 E * | 7/1987 | Leggett, Jr. | B26D 7/015 | 30/233 |
| 4,843,753 A * | 7/1989 | Mace | A01K 97/04 | 43/4 |
| 4,923,234 A * | 5/1990 | Fairley | A47G 21/10 | 294/5 |
| 4,976,718 A * | 12/1990 | Daniell | A61B 17/30 | 294/902 |
| 4,979,326 A * | 12/1990 | Aaron | A01K 97/18 | 43/4 |
| 4,987,683 A * | 1/1991 | Brych | G06K 1/06 | 30/358 |
| 5,054,226 A * | 10/1991 | Hart | A01K 97/18 | 43/4 |
| 5,090,097 A * | 2/1992 | Koester, Jr. | A01K 97/00 | 43/4 |
| D326,803 S * | 6/1992 | Reil | D8/54 | |
| 5,217,464 A * | 6/1993 | McDonald | A61F 2/1662 | 24/552 |
| 5,417,005 A * | 5/1995 | Hale | A01K 97/04 | 43/4 |
| 5,465,522 A * | 11/1995 | Varda | A01K 97/04 | 43/11 |
| 5,475,941 A * | 12/1995 | Moore | A01K 97/00 | 43/4 |
| 5,791,053 A * | 8/1998 | Koong | A47G 21/02 | 294/99.2 |
| 5,862,599 A * | 1/1999 | Johnson, Jr. | A01K 11/002 | 30/363 |
| 6,352,293 B1 * | 3/2002 | Baschenis | B25B 9/02 | 294/902 |
| 6,944,986 B1 * | 9/2005 | Gonzalez | A01K 97/04 | 43/4 |
| 8,806,800 B2 * | 8/2014 | Hupp | A01K 97/00 | 43/4 |
| 8,844,193 B2 * | 9/2014 | Luongo | A01M 1/2094 | 43/132.1 |
| 9,701,036 B2 * | 7/2017 | Dion | B26F 1/36 | |
| 2008/0271360 A1 * | 11/2008 | Barfield | A01K 97/18 | 43/4 |
| 2012/0260556 A1 * | 10/2012 | Hupp | A01K 97/14 | 43/4 |
| 2013/0199077 A1 * | 8/2013 | Tatum | A01K 97/00 | 43/4 |

FOREIGN PATENT DOCUMENTS

| | | | |
|---|---|---|---|
| JP | 09275868 A | * | 10/1997 |
| JP | 10191854 A | * | 7/1998 |
| JP | 10201404 A | * | 8/1998 |
| JP | 11206299 A | * | 8/1999 |
| JP | 2000125737 A | * | 5/2000 |
| JP | 2000245320 A | * | 9/2000 |
| JP | 2002142632 A | * | 5/2002 |
| KR | 101250292 B1 | * | 4/2013 |

* cited by examiner

LEECH CLAMP

CROSS-REFERENCE TO RELATED APPLICATION(S)

None.

FIELD OF THE INVENTION

This invention relates generally to sporting equipment. More specifically it relates to fishing tackle that facilitates the baiting of a hook. The invention thus relates to devices, systems and methods adapted for use with live bait, namely leeches.

BACKGROUND OF THE INVENTION

One of the most popular outdoor sports is fishing. While fishing, many fishermen prefer to use live bait. A variety of live baits are utilized, depending on the circumstances, and the fish desired.

Sometimes they use crickets or nightcrawlers and sometimes they use baitfish. Although nightcrawlers are not difficult to catch, crickets and baitfish are notorious for the difficulties that they impose on fishermen. Specifically leeches, minnows, chubs, suckers and other baitfish pose the most problems. Similar problems may also be encountered in pet shops when trying to only catch one.

The same is true while attempting to bait a hook with live bait—they move and are thus difficult to isolate and catch. Further, many anglers would prefer not to have to use his or her hands to catch the live bait for a variety of reasons. Thus, there is a need in the art for an improved means of applying live bait to hooks.

BRIEF SUMMARY OF THE INVENTION

Discussed herein are various apparatus, systems and methods relating to the application of live bait to a fishing hook by way of a clamp.

Accordingly, it is an object of the invention to provide a new and improved leech clamp. Another object of the invention is to provide a leech clamp that is economical to produce.

A further object of the invention is to provide a leech clamp that does not rust. Another object of the invention is to provide a leech clamp that does not require the connection of a net to a frame or handle. Yet another object of the invention is to provide a leech clamp that provides the user with a quick means of catching the leech and baiting the hook.

In Example 1, a bait clamp, comprises an elongate body, which further comprises a first end, a second end, and a plurality of elongate segments, and a grasper, which further comprises a first contoured grasping portion further comprising at least one tine, and a second contoured grasping portion further comprising at least one tine, wherein the grasper is fixedly attached to the first end of the body and in operational communication with the plurality of elongate segments so as to be configured to be capable accepting bait and further wherein the tines are configured to grasp bait.

In Example 2, the bait clamp according to Example 1 is provided, wherein the clamp is configured to be capable of open and closed positions.

In Example 3, the bait clamp according to Example 2 is provided, wherein the plurality of tines further comprise at least one male tine and at least one female tine.

In Example 4, the bait clamp according to Example 3 is provided, wherein the plurality of elongate segments are adapted so as to urge the grasper into the closed position.

In Example 5, the bait clamp according to Example 4 is provided, wherein the plurality of elongate segments further comprise at least one fastener.

In Example 6, the bait clamp according to Example 5 is provided, wherein the plurality of elongate segments further comprise a scissor configuration.

In Example 7, the bait clamp according to Example 6, wherein the at least one male tine is configured to pass through at least one female tine when being urged between the open and closed positions.

In Example 8, the bait clamp according to Example 5, wherein the grasper is configured to grasp bait without killing the bait.

In Example 9, a bait clamping system is provided, comprising an elongate body, further comprising a plurality of fixedly attached elongate segments, the body further comprising first and second ends, and a grasper, further comprising a plurality of tines comprising at least one contoured portion, wherein the grasper is fixedly attached to the first body end and in operational communication with the plurality of elongate segments so as to be capable of grasping live bait between the tines.

In Example 10, the bait clamping system according to Example 9, wherein the clamp is configured to be capable of open and closed positions.

In Example 11, the bait clamping system according to Example 10, wherein the plurality of elongate segments are adapted to urge the grasper into the closed position.

In Example 12, the bait clamping system according to Example 11, wherein the plurality of tines further comprise at least one male tine and at least one female tine.

In Example 13, the bait clamp according to Example 11, wherein at least one male tine is configured to pass through at least one female tine when being urged between the open and closed positions.

In Example 14, the bait clamping system according to Example 13, wherein the plurality of tines further comprise an opening adapted to accommodate a hook.

In Example 15, the bait clamping system according to Example 14, wherein the grasper is configured to grasp bait without killing the bait when urged into the closed position.

In Example 16, a method of baiting a hook is provided, comprising providing a bait clamp, the clamp comprising an elongate body, further comprising a plurality of fixedly attached elongate segments, the body further comprising first and second ends, and a grasper in operational communication with the elongate segments, the grasper further comprising a plurality of tines, the tines each comprising at least one contoured portion and an opening adapted to accommodate a hook, and baiting a hook, comprising the steps of grasping live bait between the tines of the grasper, and hooking the grasped bait, wherein the clamp is configured to be capable of open and closed positions so as to grasp live bait.

In Example 17, the bait clamping system according to Example 16, wherein the plurality of elongate segments are adapted to urge the grasper into the closed position.

In Example 18, the bait clamping system according to Example 17, wherein the plurality of tines further comprise at least one male tine and at least one female tine.

In Example 19, the bait clamp according to Example 18, wherein at least one male tine is configured to pass through at least one female tine when being urged between the open and closed positions.

In Example 20, the bait clamping system according to Example 19, wherein the grasper is configured to grasp bait without killing the bait when urged into the closed position.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Exemplary embodiments of the invention may relate specifically to apparatus, systems or methods. For brevity in this description, these embodiments may be variously referred to as the "leech clamp," "clamp," or "clamping system," none of which are intended to limit the scope of the invention to a single modality.

In general terms, the disclosed clamp is used for catching leeches and other live bait and preparing the bait for, and applying the bait to a hook or other fishing means. Certain embodiments address the catching and application of leeches, though other bait may also be utilized, such as nightcrawlers, minnows, and the like.

Figure 1:
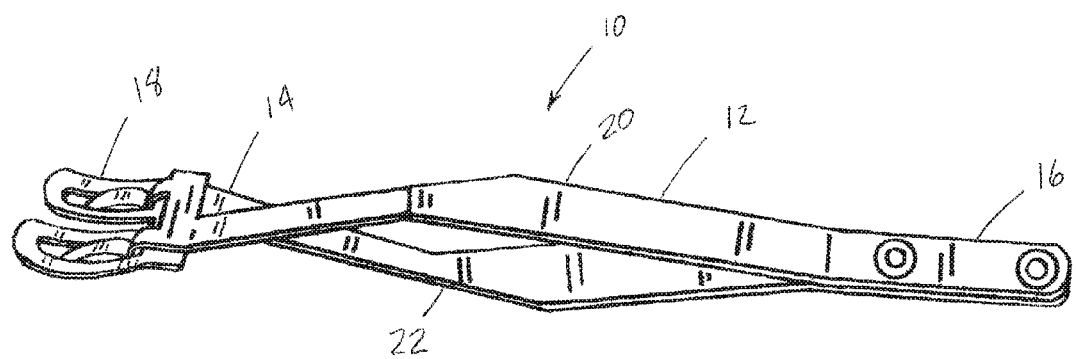
FIG. 1 is a side view of an exemplary embodiment of the clamp.

Turning to the Figures in detail, FIGS. 1-8 depict various embodiments of the leech clamp 10. As is shown in FIG. 1, exemplary embodiments of the clamp 10 comprise a generally elongate body 12 having a first, or distal end 14 and a second, or proximal, end 16. In the embodiment depicted in FIG. 1, the first end 14 further comprises a grasper 18, which is further discussed in relation to FIG. 2. In the embodiment of FIG. 1, the body 12 further comprises a plurality of elongate segments 20, 22, the function of which are discussed in detail in relation to FIGS. 3-5. In certain embodiments, such as the one depicted in FIG. 1, the elongate segments 20, 22 are placed in a scissor configuration, such that they overlap at the distal end 14. In exemplary embodiments, the clamp 10 is comprised of metal, such as steel. In certain embodiments, the clamp is die cast. In certain other embodiments, the clamp is comprised of plastic, such as molded plastic. Further embodiments are comprised of one or more of: spring steel, half- or quarter-hard steel, stainless steel, alloys, plastics and/or polymers.

Figure 2:
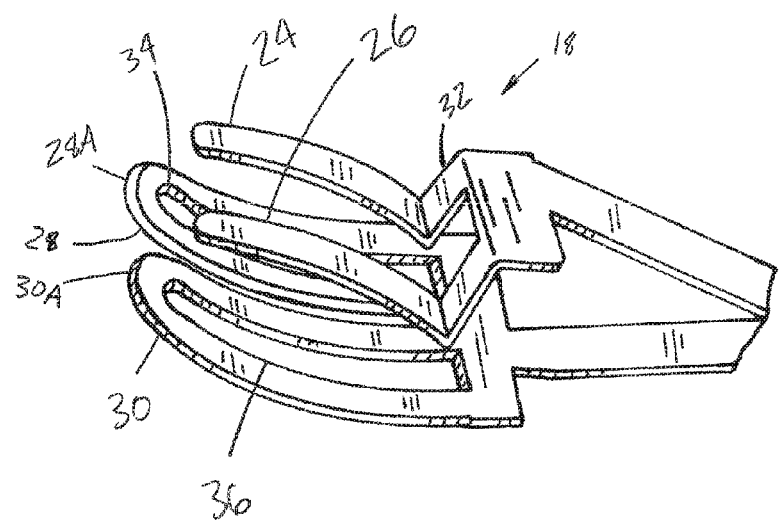
FIG. 2 is a close-up view of the grasper, according to an exemplary embodiment.

An exemplary embodiment of the grasper 18 is depicted in detail in FIG. 2. As depicted, the grasper is in the "open" position (as opposed to the "closed" position of FIG. 1). In this open position, the grasper 18 is adapted, or configured, to be capable of accepting a leech within the plurality of tines 24, 26, 28, 30, which are set out on the first and second contoured, or spoon-shaped grasping portions (in this embodiment, the first grasping portion is comprised of the male tines 24, 26 and the second is comprised of the female tines 28, 30). As is depicted in FIG. 2, these tines may be generally rectangular, flat and male 24, 26 or female 28, 30. The female tines 28, 30 further define openings 34, 36 so as to allow passage of the male tines 24, 26 through the female tine openings 34, 36, as is shown, for example, in FIG. 2. In certain exemplary embodiments, the distal ends 28A, 30A of the female tines are rounded, so as reduce sharp corners and to prevent unnecessary injury to the subject live bait. In further embodiments, the user may use the distal ends as a means of scraping leeches which are stuck to the container wall or floor, so as to loosen the bait for ease of grabbing, as leeches for example tend to utilize their suckers to cling to such surfaces.

Figure 6:
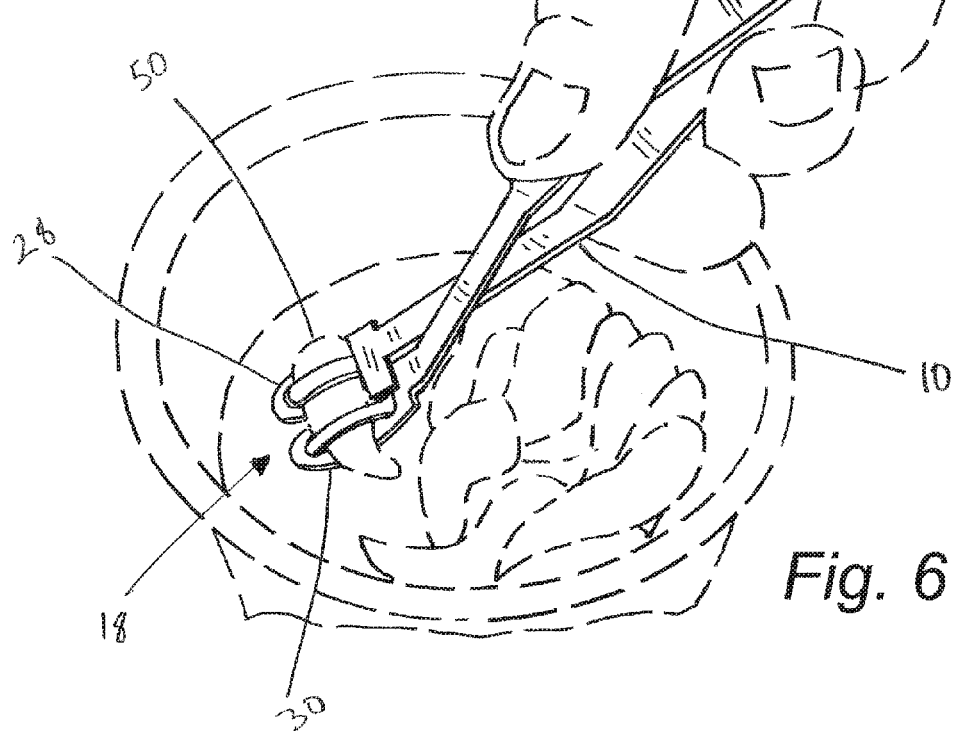
FIG. 6 is a further perspective view of the clamp on a leech, according to an exemplary embodiment.

The embodiment of FIG. 2 further features an contoured offset region 32 at the base of the grasper 18, which is configured to provide a contoured offset the distal ends of the generally rectangular tines 24, 26 to extend through the openings 34, 36 of the female tines 28, 30 while the grasper 18 is in the closed position (as can be seen at reference letter A in FIG. 3) and to introduce a contour to the inner portion of the grasper 18, as discussed further in relation to FIG. 6. As discussed elsewhere herein (particularly in relation to FIG. 7), in exemplary embodiments of the leech clamp, the female tines are configured so as to present a central slot, or opening 54 through which a hook may be easily passed. Other configurations are possible.

Figure 3:
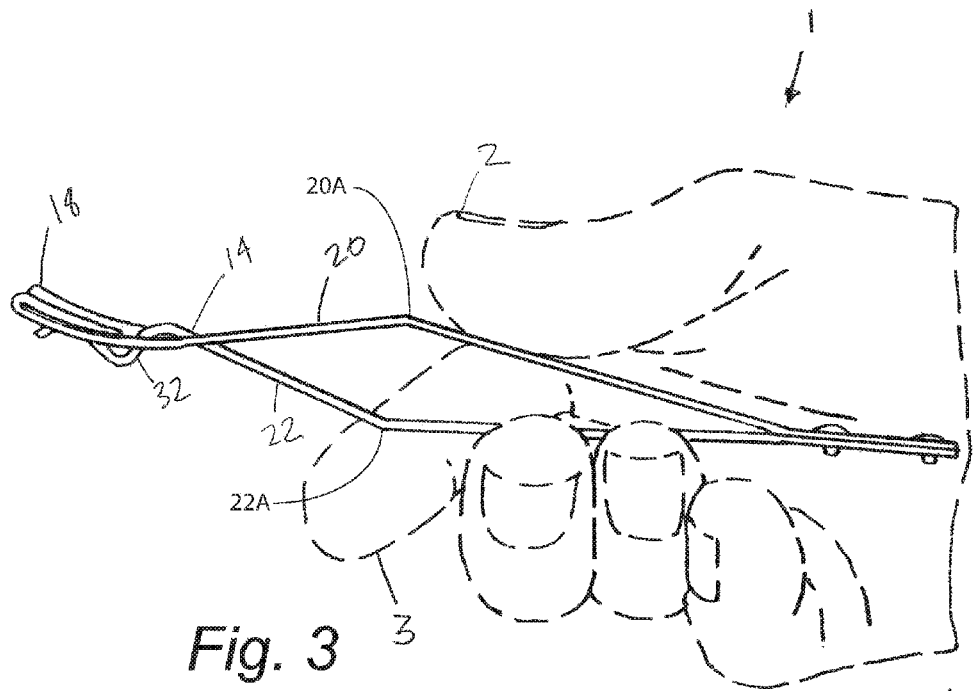
FIG. 3 is a side view of the clamp in a user's hand, according to an exemplary embodiment.
Figure 4:
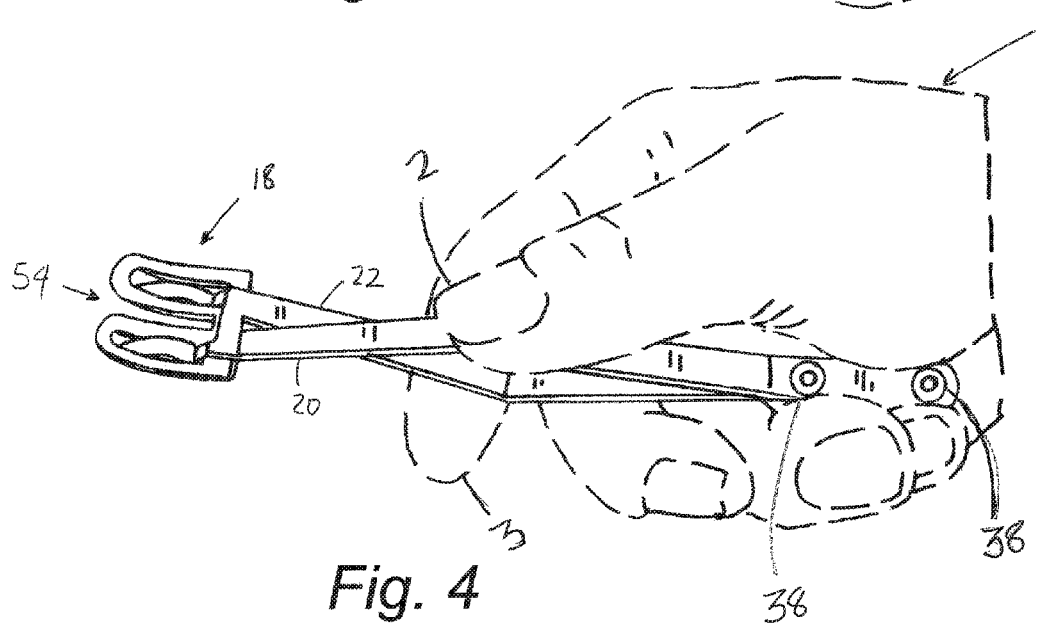
FIG. 4 is a rotated, perspective view of the clamp of FIG. 3.

As is depicted in FIGS. 3-4, in certain exemplary embodiments, the clamp body 12 further comprises a plurality of elongate segments 20, 22, which are configured to operate in a scissor, or "tongs" fashion so as to effectuate operation of the grasper 18 from a "closed" to an "open" position, as would be known to one of skill in the art. In certain embodiments, the grasper 18, and correspondingly the plurality of elongate segments 20, 22, contain certain structural tension which urges them into the "closed" position, only to be moved into the "open" position when pressure is applied by the user 1 to either side of the body 12, and therefore the plurality of elongate segments 20, 22, as is depicted elsewhere herein.

By way of example, and as depicted in FIG. 3, this operation may be performed by way of the user's thumb 2 and forefinger 3. As depicted in FIG. 3, in certain embodiments the elongate segments 20, 22 further comprise protruding regions 20A, 22A, which both facilitate the use of the clamp and provide spring functionality, thereby urging the grasper into the "closed" position. In exemplary embodiments, the spring functionality is adjusted so as to grasp, but not rupture or otherwise kill the live bait when the user ceases to apply pressure to the elongate segments. One of skill in the art would understand the means by which the elongate segments can be configured, both as to shape and materials, as well as the means of adjusting the pressure.

FIG. 4 depicts the operation of the clamp according to an exemplary embodiment, wherein the user's thumb 2 and forefinger 3 are used to urge the elongate segments 20, 22 and correspondingly the tines 24, 26, 28, 30 of the grasper 18 so as to move the clamp into the "open" position. FIG. 4 also clearly depicts that in certain embodiments, a plurality of fasteners 38 which can serve to couple, or fixedly attach, the elongate segments 20, 22 and provide spring operation, wherein coupled with the tension of the elongate segments they serve to urge the clamp into the closed position. In exemplary embodiments, rivets can be utilized. In further embodiments, a spring may be used to accomplish this urging. In yet further embodiments, other well-established fastening methods can be utilized, such as welding, spot welding, bolts, screws, glues, and the like.

As depicted in FIG. 4, in certain embodiments the elongate segments 20, 22 are generally planar and contoured offset from one another, each comprising an obtuse angle configured to allow for the grasping movement by way of a scissor-like movement, so as to accommodate the movement between the open to closed positions. Further, in such embodiments, the orientation of the individual tines may be maintained by the alignment of the elongate segments relative to one another at the grasper, as is depicted best in FIG. 4. In this configuration, the elongate segments 20, 22 are placed flush with one another horizontally. Other configurations are possible.

Figure 5:
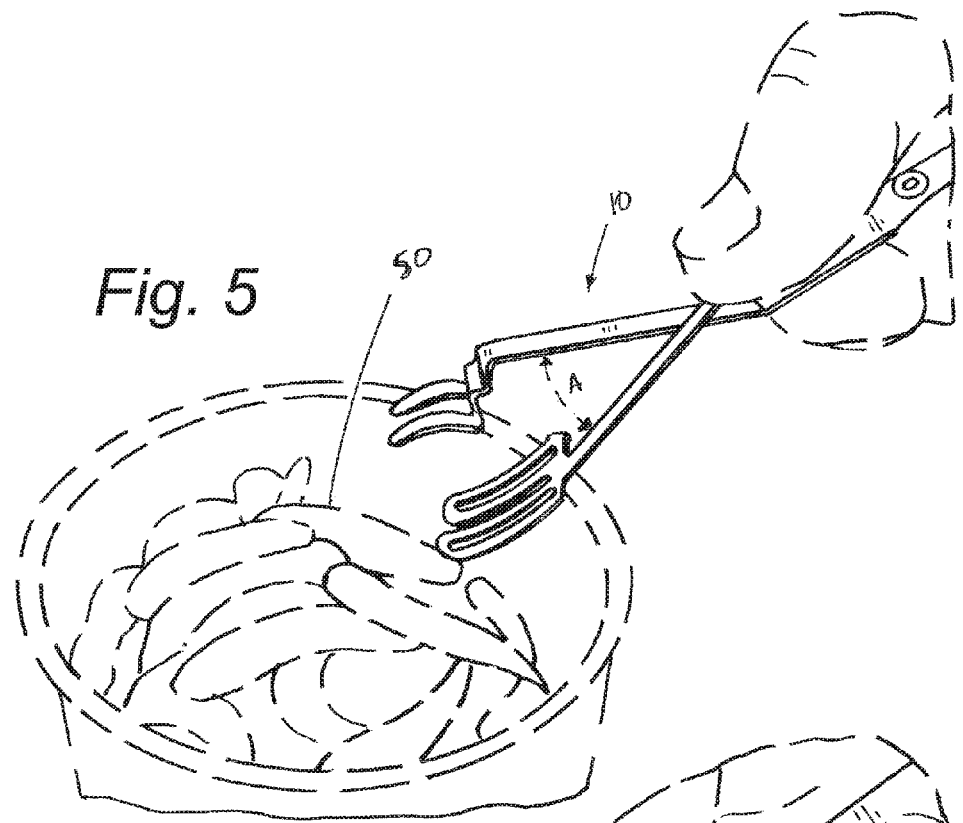
FIG. 5 is a perspective view of one embodiment of the clamp in use with live bait.

As is shown in FIGS. 5-6, in certain embodiments, once the clamp 10 has been set in the "open" position (designated here by the reference arrow "A"), the user may use the clamp 10 to grasp live bait, such as leeches 50. In these configurations, the user's grip on the elongate segments 20, 22 may then be relaxed, and the grasper 18 will be correspondingly urged back into the "closed" position around a leech or other live bait 50, as is shown best in FIG. 6.

Leeches are generally oval-shaped, as are many other live baits. Accordingly, certain embodiments of the tines may also feature a curved, or otherwise contoured configuration, so as to be configured to extend around the body of a leech (or other bait), as is depicted further in relation to FIG. 6. In these exemplary embodiments, the tines 28, 30 are configured to surround the live bait and curve to the contour of its body and hold it for the maximal surface area. As such, in these embodiments, the contoured grasper 18 is able to cradle the leech or other bait 50.

Figure 7:
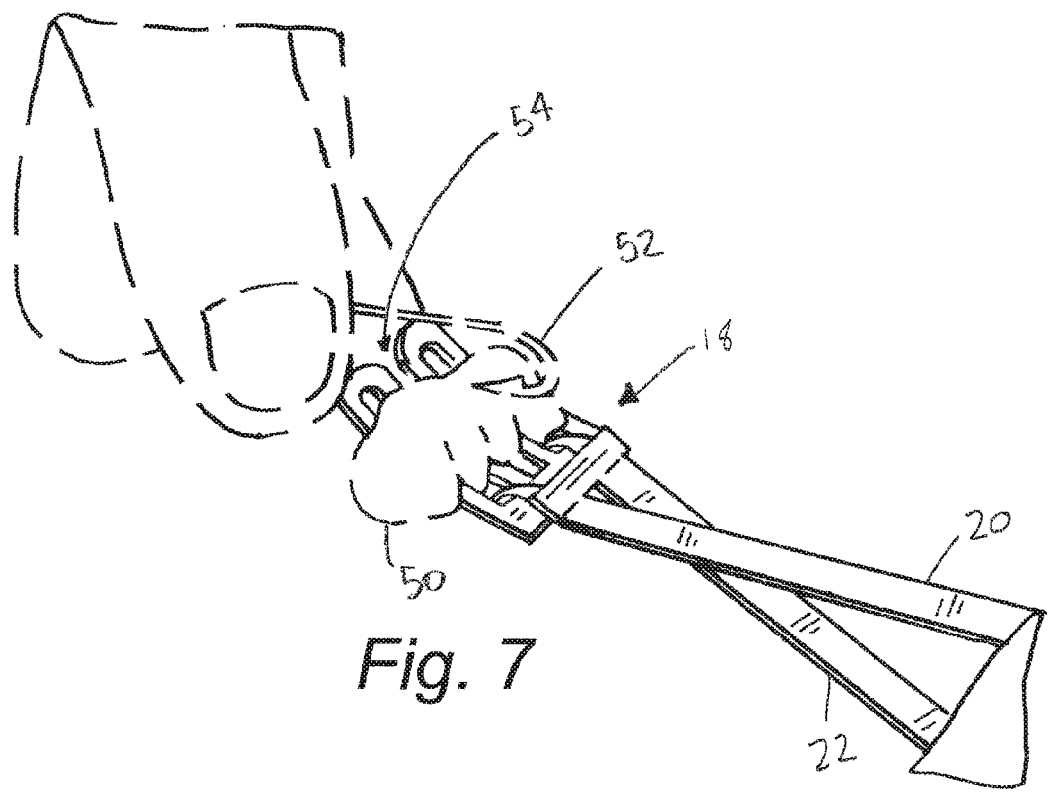
FIG. 7 is a further perspective view of the clamp being used to hook live bait, showing a close-up view of the grasper according to one embodiment.
Figure 8:
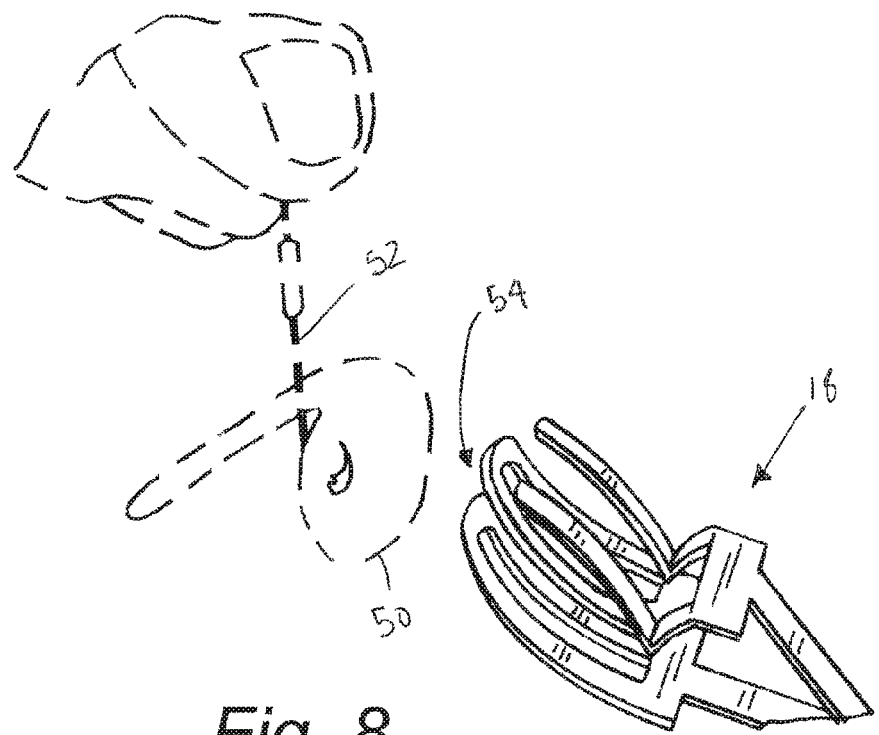
FIG. 8 is a close-up, perspective view of the grasper following the application of the bait to a hook, according to a further exemplary embodiment.

FIGS. 7-8 depict the application of the leech 50 to a hook 52, which is sometimes called "baiting." As shown in FIG. 7, in certain exemplary embodiments, the female tines 28, 30 are arranged so as to leave an opening 54 which runs, for example, longitudinally along the grasper 18. In these embodiments, the grasper is thereby configured for the easy passage of the hook 52 through the leech 50 while it is being held by the grasper 18 in the closed position. Other configurations are of course possible. As is shown in FIG. 8, after the leech 50 or other live bait has been baited to the hook 52, the user may once again apply pressure to the elongate segments 20, 22, thereby moving the grasper 18 into the "open" position and removing the hook 52 and leech for use in fishing.

Although the present invention has been described with reference to preferred embodiments, persons skilled in the art will recognize that changes may be made in form and detail without departing from the spirit and scope of the invention.

What is claimed is:

1. A bait clamping system, comprising:
   a. an elongate body comprising first and second fixedly attached elongate segments each comprising first and second ends;
   b. a male grasper disposed at the first end of the first elongate segment, the male grasper comprising two rectangular contoured male tines comprising an offset region; and
   c. a female grasper disposed at the first end of the second elongate segment, the female grasper comprising two female tines defining two enclosed female tine openings, respectively, and a hook opening between the two enclosed female tine openings,
   wherein the male tines are configured to pass through the enclosed female tine openings when the clamping system is in a closed position and withdraw from the female tine openings when the clamping system is in an open position,
   wherein the female and male graspers are substantially spoon-shaped, such that the female and male graspers are convexly curved with respect to one another, and
   wherein each of the male tines, the female tines, and the female tine openings is curved along a length thereof.

2. The bait clamping system of claim 1, wherein the graspers are configured to be capable of moving between the open and closed positions.

3. The bait clamping system of claim 2, wherein the first and second elongate segments are adapted to urge the graspers into the closed position.

4. The bait clamping system of claim 2, wherein the elongate body is comprised of at least one of the group consisting of: steel, plastic, molded plastic, spring steel, half-hard steel, quarter-hard steel, stainless steel, alloy and polymer.

5. The bait clamping system of claim 3, wherein the first and second elongate segments are disposed in a scissor configuration.

6. The bait clamping system of claim 1, wherein the clamp is configured to grasp bait without killing the bait when urged into the closed position.

7. A bait clamp, comprising:
   a. a first elongate segment having proximal and distal ends and a female grasping portion disposed at the distal end, the female grasping portion comprising:
      i. a female base portion having first and second ends;
      ii. a first contoured female tine disposed at the first end of the female base portion and defining a first female opening;
      iii. a second contoured female tine disposed at the second end of the female base portion and defining a second female opening; and
      iv. an opening defined between the first and second contoured female tines configured to accept a hook between the tines;
   b. a second elongate segment having proximal and distal ends and a male grasping portion disposed at the distal end, the male grasping portion comprising:
      i. a first contoured male tine comprising a first distal offset region; and
      ii. a second contoured male tine comprising a second distal offset region, wherein the clamp is configured to be capable of open and closed positions, and wherein in the closed position the first and second distal offset regions are configured to pass through the first and second female openings, respectively, and
   wherein the first and second elongate segments are adapted to urge the clamp into the closed position, wherein the contoured female and male grasping portions are substantially spoon-shaped, such that the female and male grasping portions are curved with respect to one another so as to grasp a bait, and wherein each of the first and second female tines, the first and second female openings, and the first and second male tines is curved along a length thereof.

8. The bait clamp of claim 7, further comprising at least one fastener disposed at the distal ends of the first and second elongate segments.

9. The bait clamp of claim 8, wherein the first and second elongate segments comprise a scissor configuration.

10. The bait clamp of claim 7, wherein the bait clamp is comprised of at least one of the group consisting of: steel, plastic, molded plastic, spring steel, half-hard steel, quarter-hard steel, stainless steel, alloy and polymer.

11. The bait clamp of claim 7, wherein the first and second elongate segments are disposed in a scissor configuration.

12. The bait clamp of claim 7, wherein the substantially spoon-shaped female and male grasping portions allow a user to grasp the bait without rupturing or killing the bait.

\* \* \* \* \*